United States Patent
Furuta et al.

(10) Patent No.: US 11,785,455 B2
(45) Date of Patent: *Oct. 10, 2023

(54) COMMUNICATION DEVICE AND SYSTEM

(71) Applicant: KABUSHIKI KAISHA TOKAI RIKA DENKI SEISAKUSHO, Aichi (JP)

(72) Inventors: Masateru Furuta, Aichi (JP); Shigenori Nitta, Aichi (JP); Yuki Kono, Aichi (JP); Yosuke Ohashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 254 days.

This patent is subject to a terminal disclaimer.

(21) Appl. No.: 17/033,719

(22) Filed: Sep. 26, 2020

(65) Prior Publication Data

US 2021/0136574 A1    May 6, 2021

(30) Foreign Application Priority Data

Nov. 1, 2019   (JP) .................... 2019-200023

(51) Int. Cl.
*H04L 29/06*     (2006.01)
*H04W 12/06*    (2021.01)
*H04W 12/10*    (2021.01)
*H04W 4/02*     (2018.01)

(52) U.S. Cl.
CPC ........... *H04W 12/06* (2013.01); *H04W 4/023* (2013.01); *H04W 12/10* (2013.01)

(58) Field of Classification Search
CPC ...... H04W 12/06; H04W 12/10; H04W 4/023
USPC ........................................... 726/6
See application file for complete search history.

(56) References Cited

U.S. PATENT DOCUMENTS

| | | | |
|---|---|---|---|
| 2014/0285319 A1* | 9/2014 | Khan ................ | B60R 25/00 340/5.61 |
| 2018/0162321 A1* | 6/2018 | Spiess ............... | G07C 9/00309 |
| 2020/0374122 A1 | 11/2020 | Naiki et al. | |

FOREIGN PATENT DOCUMENTS

| | | |
|---|---|---|
| JP | 11-208419 A | 8/1999 |
| JP | 2008-165719 | 7/2008 |
| JP | 2019-169790 | 10/2019 |

* cited by examiner

*Primary Examiner* — Evans Desrosiers
(74) *Attorney, Agent, or Firm* — Greenblum & Bernstein, P.L.C.

(57) ABSTRACT

[Object] To provide a mechanism that makes it possible to avoid inconveniences when the authentication process has abnormality.
[Solution] A communication device comprising a control section configured to control each of a first process that achieves a prescribed function, and a second process that authenticates another communication device and that is different from the first process, wherein the control section performs control in such a manner that the second process is not performed in a case where abnormality is recognized.

10 Claims, 4 Drawing Sheets

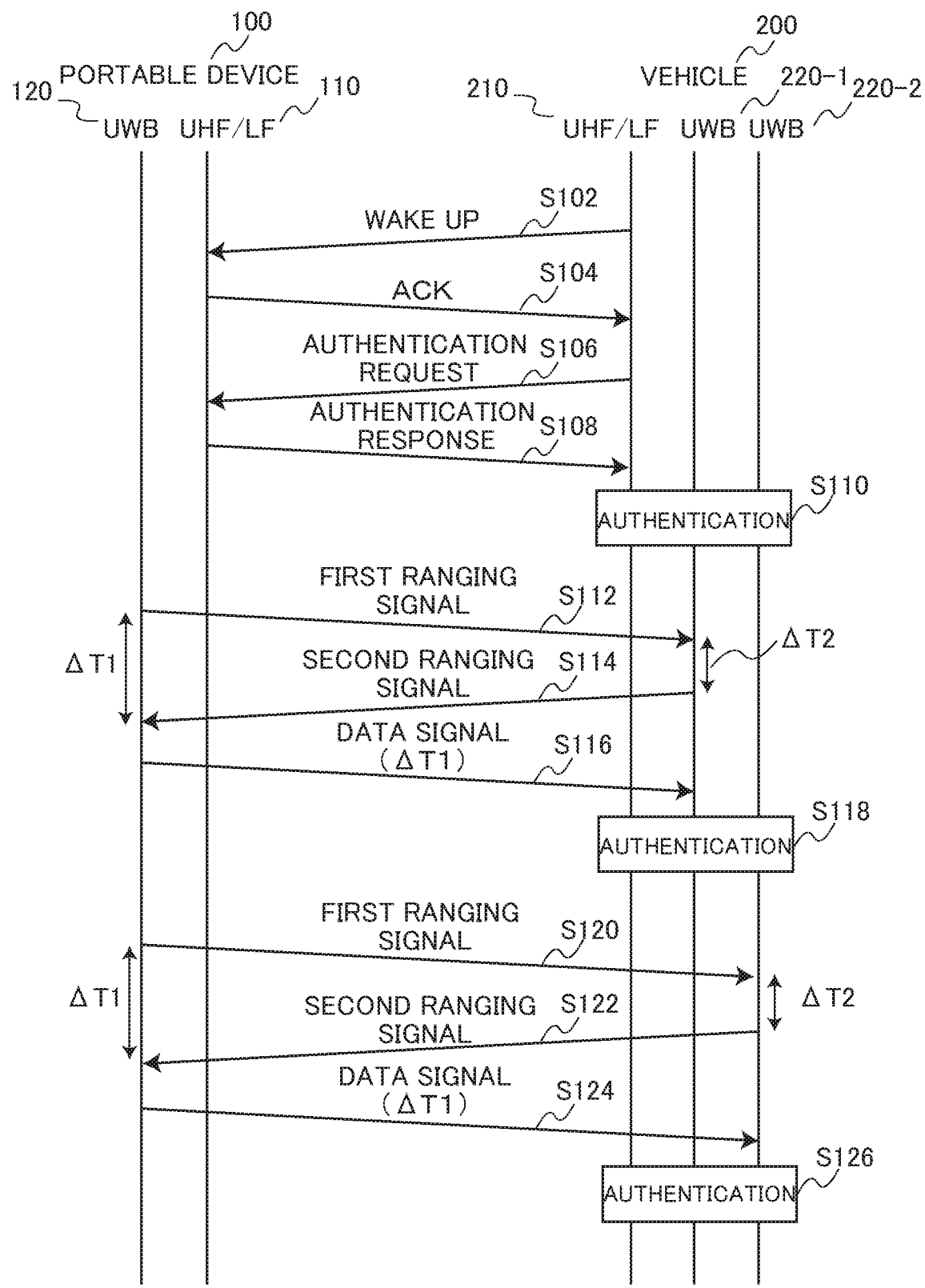

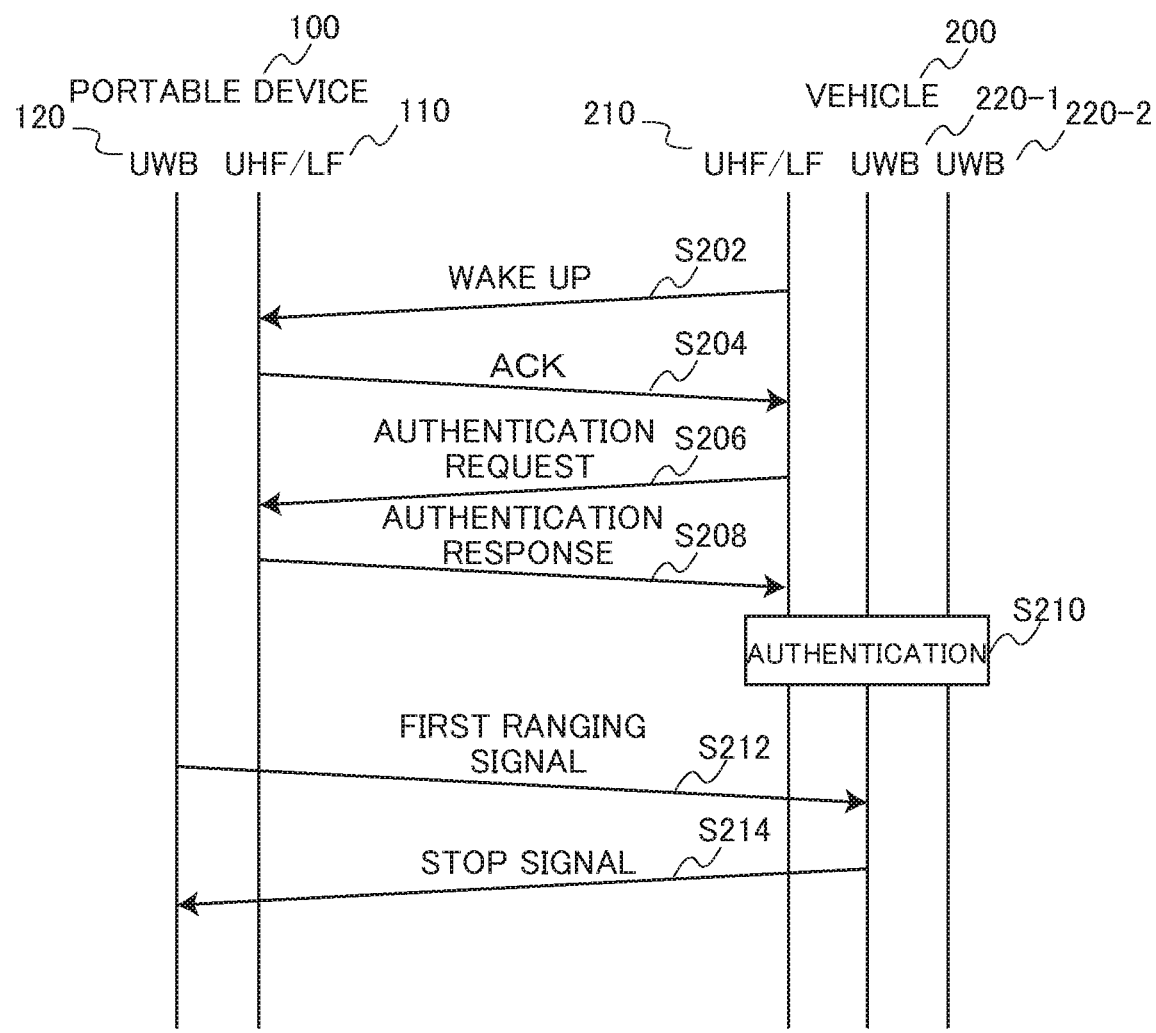

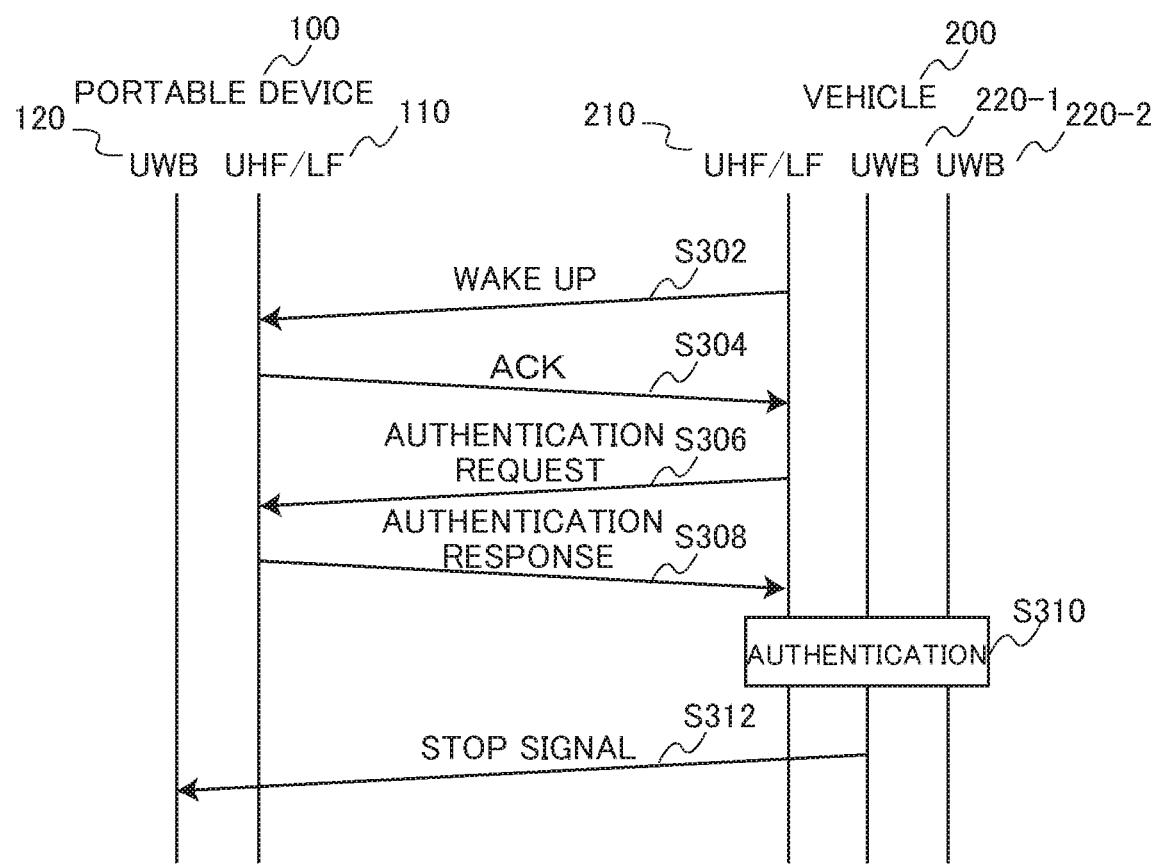

COMMUNICATION DEVICE AND SYSTEM

CROSS REFERENCE TO RELATED APPLICATION(S)

This application is based upon and claims benefit of priority from Japanese Patent Application No. 2019-200023, filed on Nov. 1, 2019, the entire contents of which are incorporated herein by reference.

BACKGROUND

The present invention relates to a communication device and a system.

In recent years, technologies of performing authentication in accordance with a result of transmitting/receiving signals between devices have been developed. For example, JP H11-208419A discloses a technology of authenticating a portable device by transmitting/receiving signals between an in-vehicle device and the portable device.

However, it is hard to say that the technology disclosed in JP H11-208419A sufficiently handles a case where an authentication process has abnormality. Therefore, a various kinds of inconveniences may be caused when an authentication process has abnormality.

Accordingly, the present invention is made in view of the aforementioned issues, and an object of the present invention is to provide a mechanism that makes it possible to avoid inconveniences when the authentication process has abnormality.

SUMMARY

To solve the above described problem, according to an aspect of the present invention, there is provided a communication device comprising a control section configured to control each of a first process that achieves a prescribed function, and a second process that authenticates another communication device and that is different from the first process, wherein the control section performs control in such a manner that the second process is not performed in a case where abnormality is recognized.

To solve the above described problem, according to another aspect of the present invention, there is provided a communication device comprising a control section configured to control each of a first process that achieves a prescribed function, and a second process that includes authentication of another communication device and that is different from the first process, wherein the control section performs control in such a manner that the second process is stopped in a case where a stop signal for stopping the second process is received from the other communication device.

To solve the above described problem, according to another aspect of the present invention, there is provided a system comprising: a first communication device; and a second communication device, wherein the first communication device includes a first control section configured to control each of a first process that achieves a prescribed function and a second process that performs authentication between the first communication device and the second communication device and that is different from the first process, the first control section performs control in such a manner that a stop signal for stopping the second process is transmitted to the second communication device in a case where abnormality of the first process is recognized, the second control device includes a second communication section configured to control each of the first process and the second process, and the second control section performs control in such a manner that the second process is stopped in a case where the stop signal is received from the first communication device.

As described above, according to the present invention, there is provided a mechanism that makes it possible to avoid inconveniences when the authentication process has abnormality.

BRIEF DESCRIPTION OF THE DRAWINGS

FIG. 2 is a sequence diagram illustrating an example of a flow of an authentication process performed in the system according to the present embodiment.

FIG. 3 is a sequence diagram illustrating another example of a flow of an authentication process performed in the system according to the present embodiment.

FIG. 4 is a sequence diagram illustrating another example of a flow of an authentication process performed in the system according to the present embodiment.

DETAILED DESCRIPTION OF THE EMBODIMENT(S)

Figure 1:
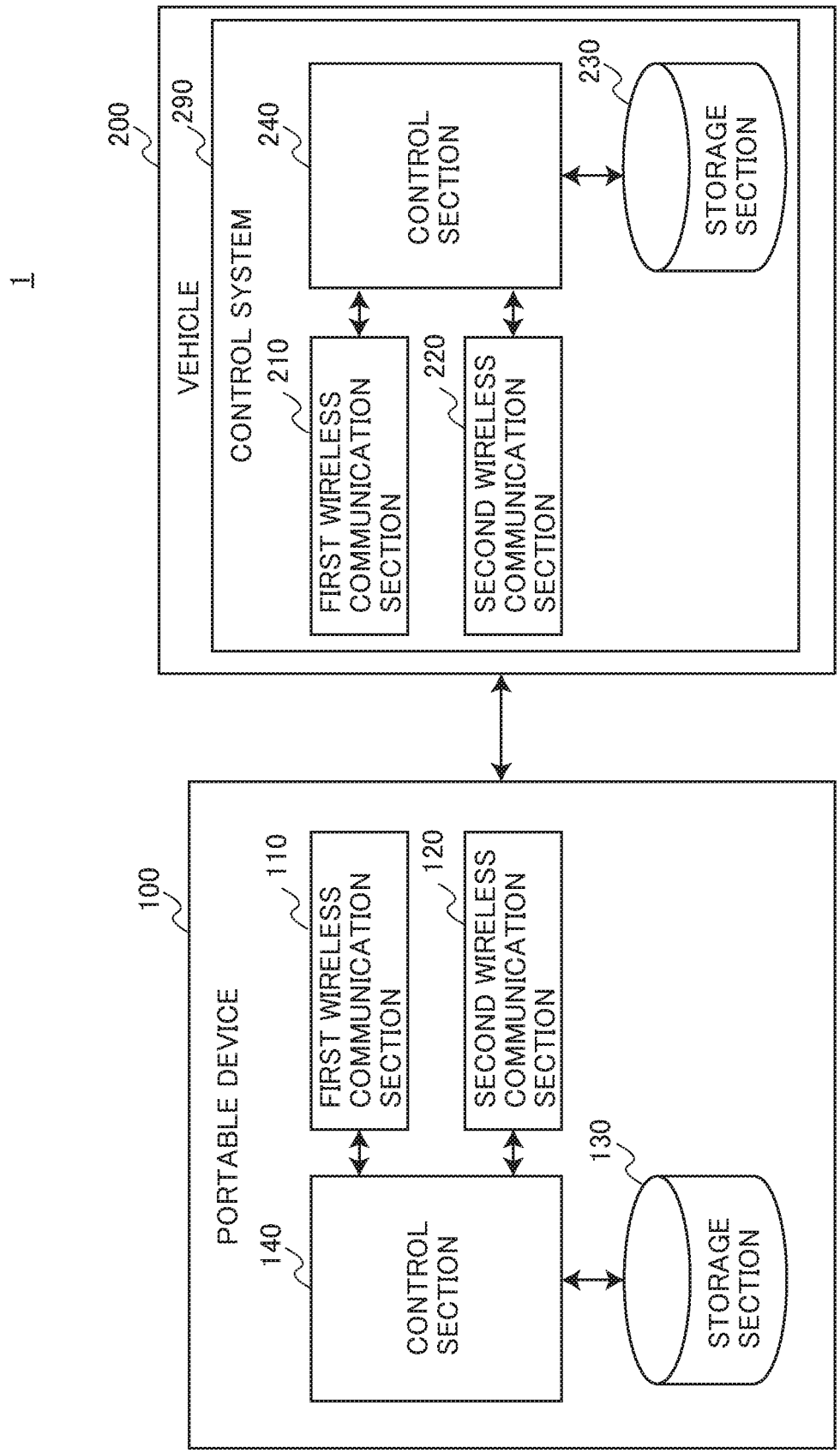
FIG. 1 is a diagram illustrating an example of a configuration of a system according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Configuration Example

FIG. 1 is a diagram illustrating an example of a configuration of a system 1 according to an embodiment of the present invention. As illustrated in FIG. 1, the system 1 according to the present embodiment includes a portable device 100, and a control system 290 of a vehicle 200. A communication device (also referred to as a first communication device) of an authenticator and a communication device (also referred to as a second communication device) of an authenticatee are involved in the embodiment of the present invention. In the example illustrated in FIG. 1, the control system 290 of the vehicle 200 is an example of the first communication device, and the portable device 100 is an example of the second communication device.

When a user (for example, a driver of the vehicle 200) carrying the portable device 100 approaches the vehicle 200, wireless communication for authentication is established between the portable device 100 and the control system 290 of the vehicle 200. Next, when the authentication has succeeded, the vehicle performs various kinds of processes. The various kinds of processes include a process of unlocking a door lock of the vehicle 200, and a process of starting an engine. This allows the vehicle 200 to become available for the user. The system 1 is also referred to as a smart entry system. Next, respective structural elements will be described sequentially.

(1) Portable Device 100

The portable device 100 is configured as any device to be carried by the user. Examples of the any device include an electronic key, a smartphone, a wearable terminal, and the like. As illustrated in FIG. 1, the portable device 100 includes a first wireless communication section 110, a second wireless communication section 120, a storage section 130, and a control section 140.

The first wireless communication section 110 has a function of establishing communication with the control system 290 of the vehicle 200 in conformity with a first wireless communication standard. The second wireless communication section 120 has a function of establishing communication with the control system 290 of the vehicle 200 in conformity with a second wireless communication standard. In particular, the second wireless communication standard is more appropriate for ranging than the first wireless communication standard, and the second wireless communication section 120 mainly handle communication related to the ranging.

Here, the first wireless communication standard may satisfy at least any of a requirement that the first wireless communication standard achieves higher gain than the second wireless communication standard or a requirement that the first wireless communication standard achieves lower electric power consumption on a reception side than the second wireless communication standard.

As a specific example that satisfies such a requirement, the second wireless communication standard may use a carrier wave of higher frequency than frequency of a carrier wave used under the first wireless communication standard. As the frequency of the carrier wave gets higher, attenuation based on distance gets larger and the gain gets reduced. As the frequency of the carrier wave gets lower, attenuation based on distance get smaller and the gain gets increased. Accordingly, the above-described requirement related to the gain is satisfied.

In addition, when the carrier wave has a high frequency, effects on a human body such as absorption into the human body get larger, and the gain gets reduced.

Note that, considering that sampling frequency is set depending on a maximum value of frequency of the carrier wave, it is sufficient to satisfy at least a requirement that maximum frequency of the carrier wave based on the second wireless communication standard is higher than maximum frequency of the carrier wave based on the first wireless communication standard.

For example, in accordance with the first wireless communication standard, an ultra high frequency (UHF) band signal and a low frequency (LF) band signal may be used. In a typical smart entry system, the UHF band signal is used for transmission from the portable device 100 to the control system 290 of the vehicle 200, and the LF band signal is used for transmission from the control system 290 of the vehicle 200 to the portable device 100. Next, the following description will be given on an assumption that the first wireless communication section 110 is configured as a communication interface that makes it possible to perform communication by using the UHF band signal and the LF band signal. In other words, in the following description, it is assumed that the UHF band signal is used for transmission to the control system 290 of the vehicle 200, and the LF band signal is used for reception from the control system 290 of the vehicle 200.

For example, in accordance with the second wireless communication standard, an ultra-wideband (UWB) signal may be used. An UWB impulse signal has a property that makes it possible to perform positioning and ranging with high accuracy. In other words, it is possible to measure air propagation time of a radio wave with high accuracy by using the radio wave of ultra-short pulse width in a nanosecond order or lower, and it is possible to perform positioning and ranging with high accuracy on the basis of the propagation time. Note that, the UWB signal may be transmitted/received as a ranging signal or a data signal. The ranging signal may be a signal configured in a frame format that does not include a payload part for storing data. On the other hand, the data signal may be a signal configured in a frame format that includes the payload part for storing data. Next, it is assumed that the second wireless communication section 120 is configured as a communication interface that makes it possible to perform communication by using the UWB signal.

The storage section 130 has a function of storing various kinds of information for operating the portable device 100. For example, the storage section 130 stores a program for operating the portable device 100, and an identifier (ID), password, and authentication algorithm for authentication, or the like. For example, the storage section 130 includes a storage medium such as flash memory, and a processing device that performs recording/playback on/of the storage medium.

The control section 140 has a function of controlling overall operation performed by the portable device 100. The control section 140 is an example of the second control section that controls operation of the second communication device. As an example, the control section 140 controls the first wireless communication section 110 and the second wireless communication section 120, communicates with the control system 290 of the vehicle 200, reads information from the storage section 130, and write information into the storage section 130. The control section 140 also function as an authentication control section that controls an authentication process between the portable device 100 and the control system 290 of the vehicle 200. For example, the control section 140 may include an electronic circuit such as a central processing unit (CPU) and a microprocessor.

(2) Vehicle 200

The vehicle 200 is an example of a usage target of the user. The control system 290 is installed in the vehicle 200. The control system 290 corresponds to the first communication device that performs wireless communication with the portable device 100. As illustrated in FIG. 1, the control system 290 of the vehicle 200 includes a first wireless communication section 210, a second wireless communication section 220, a storage section 230, and a control section 240.

The first wireless communication section 210 has a function of performing communication with the portable device 100 in conformity with the first wireless communication standard. Hereinafter, it is assumed that the first wireless communication section 210 is configured as a communication interface that makes it possible to perform communication by using the UHF band signal and the LF band signal.

The second wireless communication section 220 has a function of performing communication with the portable device 100 in conformity with the second wireless communication standard. Hereinafter, it is assumed that the second wireless communication section 220 is configured as a communication interface that makes it possible to perform communication by using the UWB signal.

The storage section 230 has a function of storing various kinds of information for operating the vehicle 200. For example, the storage section 230 stores a program for operating the vehicle 200, an authentication algorithm, and the like. For example, the storage section 230 includes a storage medium such as flash memory and a processing device that performs recording/playback on/of the storage medium.

The control section 240 has a function of controlling overall operation performed by the control system 290 of the vehicle 200. The control section 240 is an example of the first control section that controls operation of the first communication device. As an example, the control section 240 controls the first wireless communication section 210 and the second wireless communication section 220, communicates with the portable device 100, reads information from the storage section 230, and writes information into the storage section 230. The control section 240 also functions as an authentication control section that controls the authentication process between the portable device 100 and the control system 290 of the vehicle 200. In addition, the control section 240 also functions as a door lock control section that controls the door lock of the vehicle 200, and locks and unlocks the door lock. The control section 240 also functions as an engine control section that controls the engine of the vehicle 200, and starts/stops the engine. Note that, a motor or the like may serve as a power source installed in the vehicle 200 in addition to or instead of the engine. For example, the control section 240 may be configured as an electronic control unit (ECU).

2. Technical Problem

Existing smart entry systems do not sufficiently handle a case where the authentication process has abnormality, and various kinds of inconveniences may be caused when the authentication process has abnormality. For example, the smart entry system may perform a plurality of authentication processes. In this case, authentication succeeds only in the case where all the authentication processes are successfully completed. The authentication fails in the case where at least one of the authentication processes has abnormality. However, a result of each authentication process does not affect the other authentication process at all. Therefore, in the case where some of the authentication processes have abnormality, the other authentication processes are still performed although authentication will fail regardless of results of the other authentication processes. Such unnecessary processes also consume resources. Here, the resources include tangible and intangible resources to be used for the processes such as a computational resource, a frequency resource, or electric power.

Therefore, according to the embodiment of the present invention, there is provided a mechanism that makes it possible to avoid inconveniences when an authentication process has abnormality. Specifically, according to the embodiment of the present invention, in the case where some of the authentication processes have abnormality among the plurality of authentication process, the other authentication processes are stopped. This makes it possible to prevent resources from being consumed for unnecessary processes. Next, technical characteristics of the embodiment of the present invention will be described.

3. Technical Characteristics (1) Two-Step Authentication

The portable device 100 and the control system 290 of the vehicle 200 according to the present embodiment performs a plurality of authentication processes step by step. Authentication succeeds in the case where all the authentication processes including multiple steps are successfully completed. The authentication fails in the case where at least some of the authentication processes have abnormality. As an example, it is assumed that the two-step authentication will be performed.

An authentication process in a first step (hereinafter, referred to as a first authentication process) includes an authentication response process, for example. The authentication response process is an authentication method in which an authenticator generates an authentication request and transmits the generated authentication request to an authenticatee, the authenticatee generates an authentication response on the basis of the authentication request and transmits the generated authentication response to the authenticator, and the authenticator authenticates the authenticatee on the basis of the authentication response. The authentication request is data. The authentication response is data generated on the basis of the authentication request and information regarding the authenticatee (such as an ID and a password, for example). Typically, the authentication request is a random number and is changed with each authentication. Accordingly, the authentication response process is resistant to a replay attack. In addition, the authentication response is generated on the basis of the information regarding the authenticatee (such as an ID and a password, for example). In other words, the ID and the password themselves are not transmitted/received. This makes it possible to suppress eavesdropping.

Note that, the first authentication process is an example of a first process according to the present embodiment.

An authentication process in a second step (hereinafter, also referred to as a second authentication process) that is performed subsequent to the first authentication process is authentication based on a distance, for example. The authentication based on distance includes a process of measuring a distance between the portable device 100 and the control system 290, and a process of performing authentication on the basis of a result of measuring the distance. Details of the former ranging process will be described in the next section. In the latter authentication process, the control system 290 of the vehicle 200 authenticates the portable device 100 on the basis of whether or not the measured distance satisfies a predetermined condition. For example, the control system 290 of the vehicle 200 determines that the authentication has succeeded if the measured distance is a predetermined value or less. If not, the control system 290 determines that the authentication has failed.

As described above, it is possible to enhance security when the control system 290 performs authentication on the basis of a distance in addition to the authentication response process.

In the first authentication process, signals are transmitted and received in conformity with the first wireless communication standard. On the other hand, in the second authentication process, signals are transmitted and received in conformity with the second wireless communication standard. This makes it possible to efficiently perform the first authentication process including transmission and reception of data such as the authentication request and the authentication response in conformity with the first wireless communication standard that provides higher gain. In addition, it is also possible to accurately perform the second authentication process including the authentication that is also based on a distance in conformity with the second wireless communication standard that is more suitable for ranging.

Before the first authentication process, it is also possible to transmit/receive a wake-up signal for instructing to activate a communication device, and a response to the wake-up signal. The wake-up signal causes a reception side to wake up from a sleep state. Examples of the response to the wake-up signal include an acknowledgment (ACK) signal that indicates activation, and a negative acknowledgment (NACK) signal that indicates non-activation.

(2) Ranging Process

The portable device 100 and the control system 290 of the vehicle 200 according to the present embodiment performs the ranging process for measuring a distance between the portable device 100 and the control system 290 to perform the authentication based on distance. The ranging process according to the present embodiment includes transmission/reception of the ranging signal and calculation of the distance based on time taken to transmit/receive the ranging signal. Here, the ranging signal is a signal that is wirelessly transmitted/received between the portable device 100 and the control system 290 of the vehicle 200. The ranging signal is a signal to be used for measuring the distance between the portable device 100 and the control system 290 of the vehicle 200 (more specifically, a distance between the second wireless communication section 120 and the second wireless communication section 220, which are communication sections for transmitting/receiving the ranging signal).

Specifically, the portable device 100 transmits a first ranging signal, and receives a second ranging signal transmitted as a response to the first ranging signal from the control system 290 of the vehicle 200 that has received the first ranging signal. $\Delta T1$ represents a time period from time of transmission of the first ranging signal by the portable device 100 to time of reception of the second ranging signal by the portable device 100. On the other hand, the control system 290 of the vehicle 200 receives the first ranging signal from the portable device 100, and transmits the second ranging signal to the portable device 100 as a response to the first ranging signal. $\Delta T2$ represents a time period from time of reception of the first ranging signal by the control system 290 of the vehicle 200 to time of transmission of the second ranging signal by the control system 290 of the vehicle 200.

The portable device 100 measures the time period $\Delta T1$, and transmits a data signal including information indicating the time period $\Delta T1$. Next, the control system 290 of the vehicle 200 that has received the data signal calculates the distance between the portable device 100 and the control system 290 on the basis of the data signal received from the portable device 100. The control system 290 of the vehicle 200 measures the time period $\Delta T2$ in advance, and calculates the distance between the portable device 100 and the control system 290 on the basis of the measured time period $\Delta T2$ and the time period $\Delta T1$ indicated by the data signal. Specifically, time taken to transmit or receive a one-way signal is calculated by subtracting $\Delta T2$ from $\Delta T1$ and dividing the subtracted value by 2, and then the distance between the portable device 100 and the control system 290 is calculated by multiplying the calculated time by speed of the signal.

(3) Flow of Processes of Two-Step Authentication

Next, with reference to FIG. 2, a flow of processes of the two-step authentication will be described. FIG. 2 is a sequence diagram illustrating an example of a flow of an authentication process performed in the system 1 according to the present embodiment. The portable device 100 and the control system 290 of the vehicle 200 are involved in this sequence. Note that, in FIG. 2 and other sequence diagrams, arrows connecting UHF/LF lines represent transmission/reception of signals between the first wireless communication section 110 and the first wireless communication section 210. On the other hand, arrows connecting UWB lines represent transmission/reception of signals between the second wireless communication section 120 and the second wireless communication section 220. In particular, the control system 290 of the vehicle 200 is assumed to include two UWB communicators as the second wireless communication section 220. The two UWB communicators are illustrated as UWB (220-1) and UWB (220-2).

As illustrated in FIG. 2, first, the first wireless communication section 210 transmits a wake-up signal for instructing to activate the portable device 100 (Step S102). In the present embodiment, the wake-up signal may be transmitted as an UHF band signal or an LF band signal.

The portable device 100 that has received the wake-up signal transmits an ACK signal as a response to the wake-up signal (Step S104). The ACK signal may be transmitted as an UHF band signal or an LF band signal.

Next, the authentication response process is performed as the first authentication process. First, the control section 240 generates an authentication request. Next, the first wireless communication section 210 transmits a signal including the generated authentication request (Step S106). The signal including the authentication request may be transmitted as an UHF band signal or an LF band signal.

Next, the portable device 100 that has received the authentication request generates an authentication response on the basis of the received authentication request, and transmits a signal including the generated authentication response (Step S108). The signal including the authentication response may be transmitted by using an UHF band signal or an LF band signal.

Next, when the first wireless communication section 210 receives the signal including the authentication response, the control section 240 authenticates the portable device 100 on the basis of the received authentication response (Step S110).

Next, the authentication based on distance is performed as the second authentication process. Here, the authentication is performed by transmitting/receiving UWB signals between the portable device 100 and the UWB communicator 220-1 of the vehicle 200.

First, the portable device 100 transmits a first ranging signal as a UWB signal (Step S112). When the first ranging signal is received from the portable device 100, the second wireless communication section 220 transmits a second ranging signal as a UWB signal in response to the first ranging signal (Step S114). When the second ranging signal is received, the portable device 100 measures a time period $\Delta T1$ that is a time period from time of transmission of the first ranging signal to time of reception of the second ranging signal. Next, the portable device 100 transmits, as a UWB signal, a data signal including information obtained by encrypting information indicating the measured time period $\Delta T1$ (Step S116). The second wireless communication section 220 receives this data signal.

On the other hand, the control section 240 measures a time period $\Delta T2$ that is a time period from time of reception of the first ranging signal to time of transmission of the second ranging signal in advance. Next, the control section 240 calculates a distance between the portable device 100 and the control system 290 on the basis of the measured time period $\Delta T2$ and the time period $\Delta T1$ indicated by the data signal received from the portable device 100, and performs authentication on the basis of whether or not the calculated distance satisfies a predetermined condition (Step S118).

In addition, the authentication based on distance is performed as the second authentication process. Here, the authentication is performed by transmitting/receiving UWB signals between the portable device 100 and the UWB communicator 220-2 of the vehicle 200. Processes in Step S120 to Step S126 are similar to the above-described processes in Step S112 to Step S118, except that a UWB communicator serving as the second wireless communication section 220 is different from the UWB communicator used in Step S112 to Step S118 with regard to the target of transmission/reception of the first ranging signal, the second ranging signal, and the data signal. Accordingly detailed description thereof will be omitted here.

(4) Handling of Case where Authentication Process has Abnormality

In the case where abnormality of the first process is recognized, the control system 290 of the vehicle 200 transmits a stop signal for stopping the second authentication process. Next, the portable device 100 stops the second authentication process in the case where the stop signal for stopping the second authentication process is received from the control system 290 of the vehicle 200. Examples of the abnormality that may be caused in the first authentication process include failure of transmission/reception of the authentication request, failure of transmission/reception of the authentication response, failure of the authentication based on the authentication response, suspension of the authentication process caused by circuit abnormality, power source abnormality, or the like. The abnormality that may be caused in the first authentication process may be a relative difference between a clock that operates the control section of the portable device 100 and a clock that operates the control section of the control system, for example.

Examples of the stoppage of the authentication process include no further transmission of a signal, stoppage of measurement of time periods ΔT1 and ΔT2, release of a reception standby state, transition to a sleep state, and the like. In the case where the first authentication process has abnormality, the two-step authentication will fail regardless of a result of the second authentication process. In this respect, it is possible to prevent resources from being consumed for an unnecessary process because the second authentication process is stopped in the case where the first authentication process has abnormality. The number of processes to be stopped increases as the number of UWB communicators installed in the vehicle 200 grows. Therefore, effects of preventing resources from being unnecessarily consumed are great. Next, variations of a stop signal transmission timing will be described.

Note that, the reception standby state described herein means a state where the control section is capable of introducing a received signal and performing a subsequent process. The release of the reception standby state may mean stoppage of introduction of the received signal into the control section or stoppage of performing the subsequent process using information introduced into the control section.

After Start of Second Authentication Process

After stat of the second authentication process, the control system 290 of the vehicle 200 may transmit the stop signal and interrupt the second authentication process. As indicated in Step S102 and Step S112 in FIG. 2, the second authentication process is started when the portable device 100 transmits the first ranging signal after transmission of the authentication response. Therefore, the control system 290 of the vehicle 200 transmits the stop signal at any timing after the first ranging signal is received from the portable device 100. For example, the control system 290 of the vehicle 200 may transmit the stop signal in response to the first ranging signal instead of the second ranging signal. A flow of processes performed in this case will be described with reference to FIG. 3.

FIG. 3 is a sequence diagram illustrating another example of a flow of an authentication process performed in the system 1 according to the present embodiment. The portable device 100 and the control system 290 of the vehicle 200 are involved in this sequence. Processes in Step S202 to Step S210 are similar to the above-described processes in Step S102 to Step S110. However, it is assumed that authentication in Step S210 has abnormality. Accordingly, when the portable device 100 transmits the first ranging signal as a UWB signal (Step S212), the second wireless communication section 220 that has received the first ranging signal transmits the stop signal as a UWB signal instead of the second ranging signal (Step S214). The second authentication process is interrupted when the portable device 100 receives the stop signal.

Before Start of Second Authentication Process

Before the start of the second authentication process, the control system 290 of the vehicle 200 may transmit the stop signal and cancel the start of the second authentication process. The control system 290 of the vehicle 200 transmits the stop signal before the portable device 100 transmits the first ranging signal. The portable device 100 may transmit the first ranging signal only in the case where the stop signal is not received after waiting for reception of the stop signal until a predetermined time elapses. A flow of processes performed in this case will be described with reference to FIG. 4.

FIG. 4 is a sequence diagram illustrating another example of a flow of an authentication process performed in the system 1 according to the present embodiment. The portable device 100 and the control system 290 of the vehicle 200 are involved in this sequence. Processes in Step S302 to Step S310 are similar to the above-described processes in Step S102 to Step S110. However, it is assumed that authentication in Step S310 has abnormality. Therefore, the second wireless communication section 220 transmits the stop signal as a UWB signal (Step S312). The second authentication process is not started when the portable device 100 has received the stop signal.

4. Supplement

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, although the example in which the first authentication process is the authentication response process has been described in the above embodiment, the present invention is not limited thereto. As an example, the first authentication process may be a process in which an ID, a password, or other information is transmitted and a reception side verifies them.

For example, although the example using the two-step authentication has been described in the above embodiment, the present invention is not limited thereto. For example, the present invention is applicable to any first process and any second process. The first process is a process of achieving a prescribed function. The second process is a process of performing authentication between the portable device 100 and the control system 290 of the vehicle 200. The second process is different from the first process. As an example, the first process may be a process of transmitting/receiving the wake-up signal and the response to the wake-up signal, and the second process may be the above-described second authentication process. In this case, abnormality of the first process includes failure of transmission/reception of the ACK signal, and transmission/reception of the NACK signal. In addition, in this case, the second process is started when the control system 290 of the vehicle 200 transmits the first ranging signal after receiving the wake-up signal (in addition, after transmitting a response to the wake-up signal). Next, in the case where the NACK signal or the like is received and it is recognized that the first process has abnormality, the control system 290 of the vehicle 200 transmits the stop signal before receiving the first ranging signal instead of the second ranging signal.

In addition, for example, although the example in which the authenticatee (that is, the portable device 100) transmits the first ranging signal has been described in the above embodiment, the present invention is not limited thereto. For example, it is also possible for the authenticator (that is, the control system 290 of the vehicle 200) to transmit the first ranging signal. In this case, when the first authentication process has abnormality, the control system 290 of the vehicle may cancel start of the second authentication process by transmitting the stop signal instead of the first ranging signal.

In addition, for example, although the example in which the portable device 100 serves as the authenticatee and the control system 290 of the vehicle 200 serves as the authenticator has been described in the above embodiment, the present invention is not limited thereto. The roles of the portable device 100 and the control system 290 of the vehicle 200 may be reversed, or the roles may be switched dynamically. In addition, the ranging and authentication may be performed between the control systems 290 of the vehicles 200.

In addition, for example, although the example in which the present invention is applied to the smart entry system has been described in the above embodiment, the present invention is not limited thereto. The present invention is applicable to any system that performs ranging and authentication by transmitting/receiving signals. For example, the present invention is applicable to a pair of any two devices selected from a group including portable devices, vehicles, smartphones, drones, houses, home appliances, and the like. In this case, one in the pair operates as the authenticator, and the other in the pair operates as the authenticatee. Note that, the pair may include two device of a same type, or may include two different types of devices.

In addition, in the above-described embodiment, the standard using the UHF/LF has been exemplified as the first wireless communication standard, and the standard using the UWB has been exemplified as the second wireless communication standard, for example. However, the present invention is not limited thereto. For example, it is also possible to use Wi-Fi (registered trademark), Bluetooth (registered trademark), or the like as the first wireless communication standard. In addition, it is also possible to use a standard using infrared as the second wireless communication standard, for example.

In addition, for example, although the above embodiment has been described on the assumption that the control system 290 of the vehicle 200 performs the authentication based on the authentication response, the calculation of a distance based on $\Delta T1$ and $\Delta T2$, and the authentication based on distance, the present invention is not limited thereto. For example, any of such processes may be performed by another device such as a server or a roadside unit (RSU).

In addition, for example, although the above embodiment has been described on the assumption that the control section 240 is configured as the ECU and controls overall operation of the control system 290, the present invention is not limited thereto. For example, the first wireless communication section 210 may include an ECU. In addition, the first wireless communication section 210 may perform at least a portion of information processing related to communication performed by the first wireless communication section 210 such as generation of the authentication request. The same applies to the second wireless communication section 220.

In addition, for example, although the above embodiment has been described on the assumption that the control system 290 is installed in the vehicle 200, the present invention is not limited thereto. For example, a portion or all of the control system 290 may be configured as a system separate from the vehicle 200. For example, the control system 290 may be installed in a parking space or the like for the vehicle 200. In this case, the control system 290 may wirelessly transmit a control signal to the vehicle 200 on the basis of a result of communication with the portable device 100 and may remotely control the vehicle 200.

Note that, the series of processes performed by the devices described in this specification may be achieved by any of software, hardware, and a combination of software and hardware. A program that configures software is stored in advance in, for example, a recording medium (non-transitory medium) installed inside or outside of each device. In addition, for example, when a computer executes each program, the program is read into RAM, and executed by a processor such as a CPU. The recording medium may be a magnetic disk, an optical disc, a magneto-optical disc, flash memory, or the like, for example. Alternatively, the above-described computer program may be distributed via a network without using the recording medium, for example.

Further, in the present specification, the processes described using the flowcharts and sequence diagrams are not necessarily executed in the order illustrated in the drawings. Some processing steps may be executed in parallel. In addition, additional processing steps may be employed and some processing steps may be omitted.

REFERENCE SIGNS LIST 1 system
100 portable device
110 first wireless communication section
120 second wireless communication section
130 storage section
140 control section
200 vehicle
210 first wireless communication section
220 second wireless communication section
230 storage section
240 control section

What is claimed is:
1. A communication device, comprising:
a control section configured to control each of a first process that includes an authentication response process, and a second process that authenticates another communication device and that is different from the first process,
wherein the control section performs control in such a manner that the second process is started automatically and continuously after the first process, regardless of whether an abnormality is recognized in the first process, wherein, in a case where the abnormality of the first process is recognized, the control section further performs the control in such a manner that the second process is stopped, by transmitting a stop signal for stopping the second process which follows the first process in which the abnormality is recognized to the other communication device, wherein the second process includes a ranging process that measures a distance between the communication device and the other communication device, and a process that performs authentication on a basis of a result of measuring the distance, and wherein the ranging process includes transmission of a first ranging signal by the other communication device, transmission of a second ranging signal by the communication device in response to the first ranging signal, and calculation of the distance based on time taken to transmission and reception of the first ranging signal and the second ranging signal.

2. The communication device according to claim 1, wherein, after start of the second process, the control section transmits the stop signal and interrupts the second process.

3. The communication device according to claim 2, wherein the control section transmits the stop signal instead of the second ranging signal in response to the first ranging signal in the case where the abnormality of the first process is recognized.

4. The communication device according to claim 1, wherein the authentication response process is an authentication method in which an authenticator generates an authentication request and transmits the generated authentication request to an authenticatee, the authenticatee generates an authentication response on a basis of the authentication request and transmits the generated authentication response to the authenticator, and the authenticator authenticates the authenticatee on a basis of the authentication response, the authenticator is the communication device, the authenticatee is the other communication device, the authentication request is data, the authentication response is data generated on a basis of the authentication request and information regarding the authenticatee, and the second process is started when the first ranging signal is transmitted after the other communication device transmits the authentication response.

5. The communication device according to claim 1, wherein, in the first process, signals are transmitted and received in conformity with a first wireless communication standard, and, in the second process, signals are transmitted and received in conformity with a second wireless communication standard that uses a carrier wave of higher frequency than a frequency of a carrier wave used under the first wireless communication standard.

6. The communication device according to claim 1, wherein the communication device is installable in a vehicle, and the other communication device is a device configured to be carried by a user of the vehicle.

7. The communication device according to claim 1, wherein the control section transmits the stop signal for stopping the second process which follows the first process in which the abnormality is recognized after both the abnormality is recognized in the first process and the first ranging signal is received from the other communication device in the second process, and a two-step authentication process, including the first process and the second process, will fail regardless of a result of the second process in response to the abnormality being recognized in the first process.

8. The communication device according to claim 1, wherein the control section transmits the stop signal for stopping the second process which follows the first process in which the abnormality is recognized in response to both the abnormality being recognized in the first process and the first ranging signal being transmitted between the communication device and the other communication device in the second process, and a two-step authentication process, including the first process and the second process, will fail regardless of a result of the second process in response to the abnormality being recognized in the first process.

9. A communication device, comprising a control section configured to control each of a first process that includes an authentication response process, and a second process that includes authentication of another communication device and that is different from the first process, wherein the control section performs control in such a manner that the second process is stopped in a case where a stop signal for stopping the second process is received from the other communication device, the second process being started automatically and continuously after the first process, regardless of whether an abnormality is recognized in the first process, wherein, in a case where the abnormality of the first process is recognized, the control section further performs the control in such a manner that the second process is stopped, by receiving the stop signal for stopping the second process which follows the first process in which the abnormality is recognized from the other communication device, wherein the second process includes a ranging process that measures a distance between the communication device and the other communication device, and a process that performs authentication on a basis of a result of measuring the distance, and wherein the ranging process includes transmission of a first ranging signal by the other communication device, transmission of a second ranging signal by the communication device in response to the first ranging signal, and calculation of the distance based on time taken to transmission and reception of the first ranging signal and the second ranging signal.

10. A system comprising:

a first communication device; and a second communication device, wherein the first communication device includes a first control section configured to control each of a first process that includes an authentication response process and a second process that performs authentication between the first communication device and the second communication device and that is different from the first process, the first control section performs control in such a manner that a stop signal for stopping the second process is transmitted to the second communication device in a case where an abnormality of the first process is recognized, the second process being started automatically and continuously after the first process, regardless of whether the abnormality is recognized in the first process, the second control device includes a second communication section configured to control each of the first process and the second process, the second control section performs control in such a manner that the second process which follows the first process in which the abnormality is recognized is stopped in a case where the stop signal is received from the first communication device, wherein the second process includes a ranging process that measures a distance between the first and second communication devices, and a process that performs authentication on a basis of a result of measuring the distance, and wherein the ranging process includes transmission of a first ranging signal by the second communication device, transmission of a second ranging signal by the first communication device in response to the first ranging signal, and calculation of the distance based on time taken to transmission and reception of the first ranging signal and the second ranging signal.

\* \* \* \* \*